(12) United States Patent
Hollar et al.

(10) Patent No.: US 7,999,506 B1
(45) Date of Patent: Aug. 16, 2011

(54) SYSTEM TO AUTOMATICALLY RECHARGE VEHICLES WITH BATTERIES

(75) Inventors: Seth Edward-Austin Hollar, Raleigh, NC (US); Elizabeth Anne Hollar, Raleigh, NC (US)

(73) Assignee: SeventhDigit Corporation, Raleigh, NC (US)

( * ) Notice: Subject to any disclaimer, the term of this patent is extended or adjusted under 35 U.S.C. 154(b) by 798 days.

(21) Appl. No.: 12/099,784

(22) Filed: Apr. 9, 2008

(51) Int. Cl.
*H02J 7/14* (2006.01)
*H02J 7/00* (2006.01)

(52) U.S. Cl. .................................. 320/104; 320/109
(58) Field of Classification Search .................. 320/132, 320/130, 128, 127, 108, 109, 104
See application file for complete search history.

(56) References Cited

U.S. PATENT DOCUMENTS

| | | | |
|---|---|---|---|
| 3,527,268 A | 9/1970 | Ginsburgh | |
| 4,158,802 A | 6/1979 | Rose, II | |
| 4,289,226 A | 9/1981 | Wilkinson | |
| 4,309,644 A | 1/1982 | Reimers | |
| 4,983,903 A | 1/1991 | Bae | |
| 5,157,319 A | 10/1992 | Klontz | |
| 5,187,423 A | 2/1993 | Marton | |
| 5,202,617 A | 4/1993 | Nor | |
| 5,264,776 A | 11/1993 | Hulsey | |
| 5,272,431 A * | 12/1993 | Nee | 320/109 |
| 5,306,999 A | 4/1994 | Hoffman | |
| 5,323,099 A | 6/1994 | Bruni | |
| 5,327,065 A | 7/1994 | Bruni | |
| 5,341,083 A | 8/1994 | Klontz | |
| 5,404,923 A | 4/1995 | Yamamoto | |
| 5,461,298 A * | 10/1995 | Lara et al. | 320/109 |
| 5,461,299 A | 10/1995 | Bruni | |
| 5,549,443 A | 8/1996 | Hammerslag | |
| 5,609,190 A | 3/1997 | Anderson | |
| 5,628,351 A | 5/1997 | Ramsey, Jr. | |
| 5,634,503 A | 6/1997 | Musil | |
| 5,646,500 A * | 7/1997 | Wilson | 320/108 |
| 5,684,379 A | 11/1997 | Svedoff | |
| 5,711,648 A | 1/1998 | Hammerslag | |
| 5,760,569 A | 6/1998 | Chase, Jr. | |
| 5,892,346 A | 4/1999 | Moroto | |
| 5,998,963 A | 12/1999 | Aarseth | |
| 6,024,137 A | 2/2000 | Strnad | |
| 6,094,501 A | 7/2000 | Beatty | |
| 6,157,162 A * | 12/2000 | Hayashi et al. | 320/104 |

(Continued)

FOREIGN PATENT DOCUMENTS

JP  5-207602 A  8/1993

(Continued)

*Primary Examiner* — Hoai-An D Nguyen

(57) ABSTRACT

A plug-in hybrid electric vehicle (PHEV) is an automobile which can use either electricity or gasoline. With high gasoline prices, electricity is becoming a promising alternative to power next generation automobiles. One advantage of the PHEV and the BEV (battery electric vehicle) is that charging can be done at home. However, the small battery capacity of PHEV's may require recharging the batteries almost daily. It would be convenient for an owner of a car with batteries to not have to plug in the battery each and every day that charging is required. Our invention is a system that plugs the power automatically into the vehicle with minimal human intervention using an automated docking system. The system is composed of a robotic manipulator with a camera and a processing unit. The system uses the camera and vision processing to identify the vehicle's position, and consequently, the location of the vehicle's charging receptacle. The robotic manipulator then directs the charging cord's plug into the receptacle of the vehicle. Once charging is complete, the robotic manipulator removes the plug from the vehicle.

20 Claims, 3 Drawing Sheets

Vehicle Charger Embodiment 1

U.S. PATENT DOCUMENTS

| | | | |
|---|---|---|---|
| 6,194,854 B1 * | 2/2001 | Uchibori et al. | 318/280 |
| 6,354,343 B1 | 3/2002 | Strnad | |
| 6,371,768 B1 | 4/2002 | Neblett | |
| 7,013,205 B1 | 3/2006 | Hafner | |
| 7,173,396 B2 | 2/2007 | Gunji | |
| 7,248,018 B2 | 7/2007 | Sanders, Jr. | |

FOREIGN PATENT DOCUMENTS

| | | |
|---|---|---|
| JP | 6-014408 A | 1/1994 |
| JP | 2000-092727 A | 3/2000 |

* cited by examiner

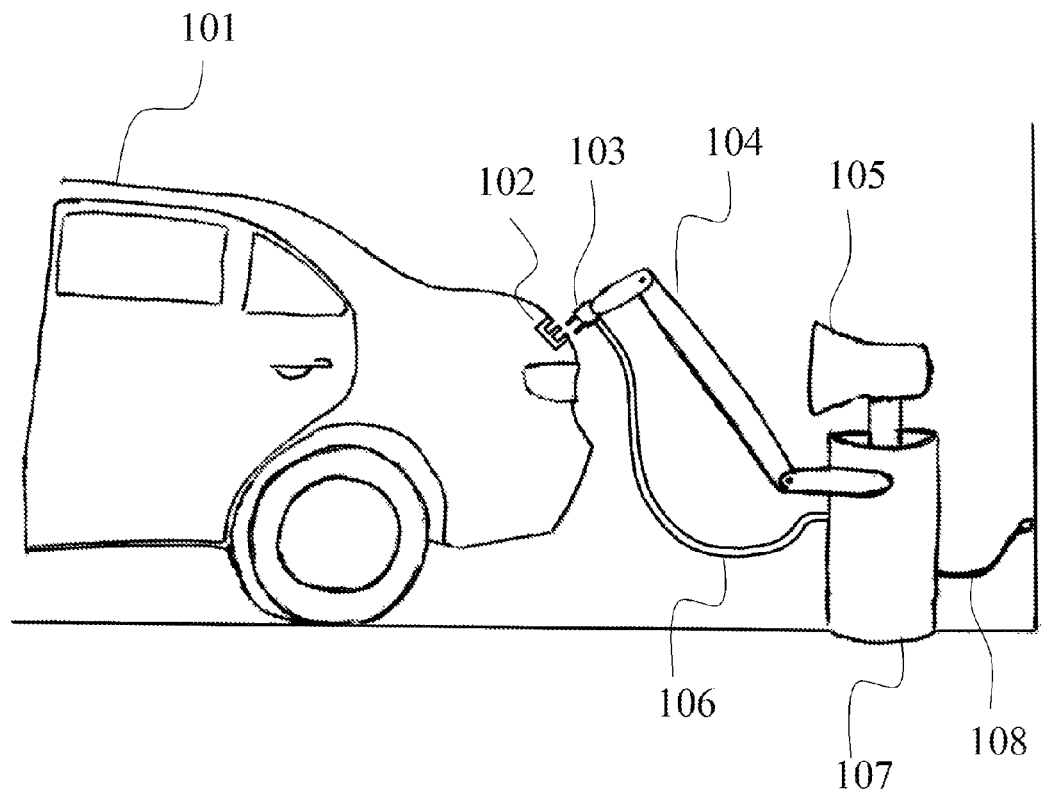
Figure 1. Vehicle Charger Embodiment 1

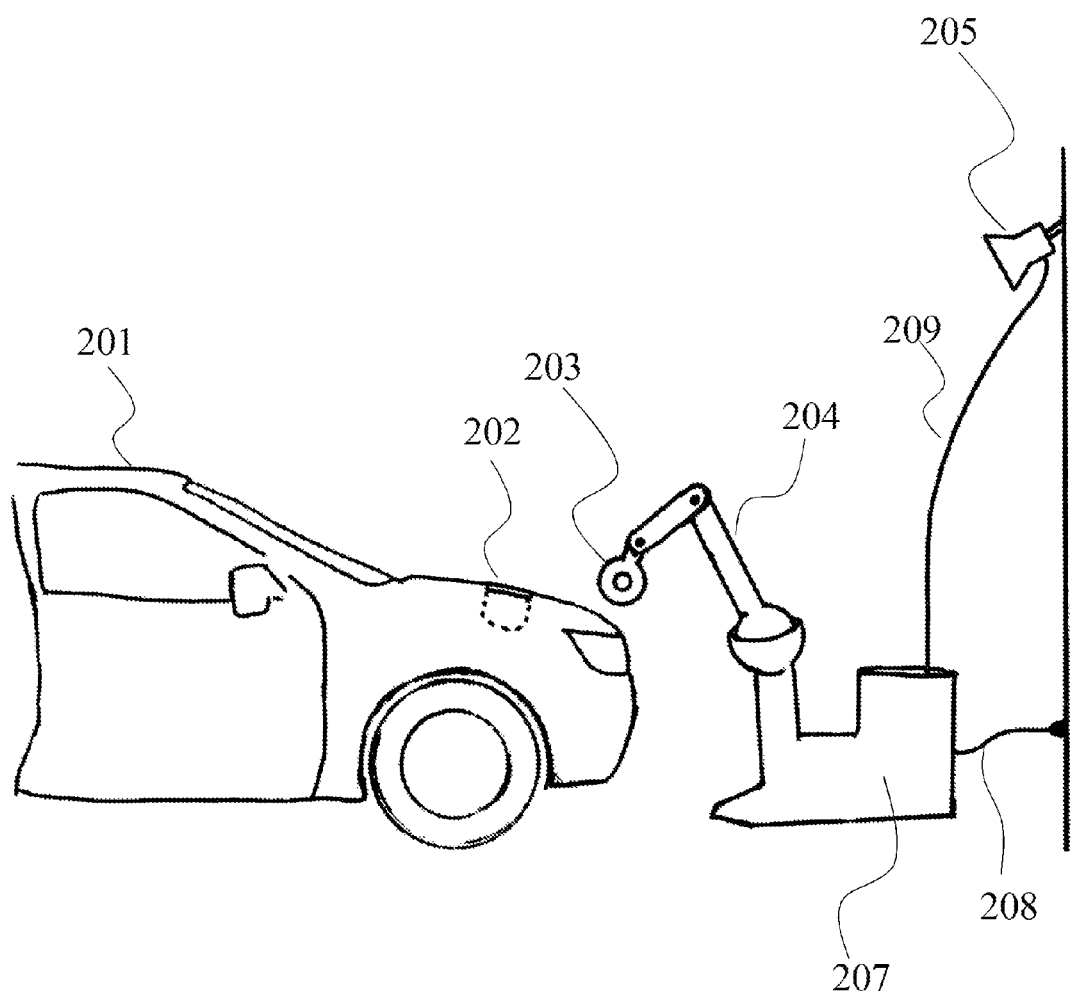
Figure 2. Vehicle Charger Embodiment 2

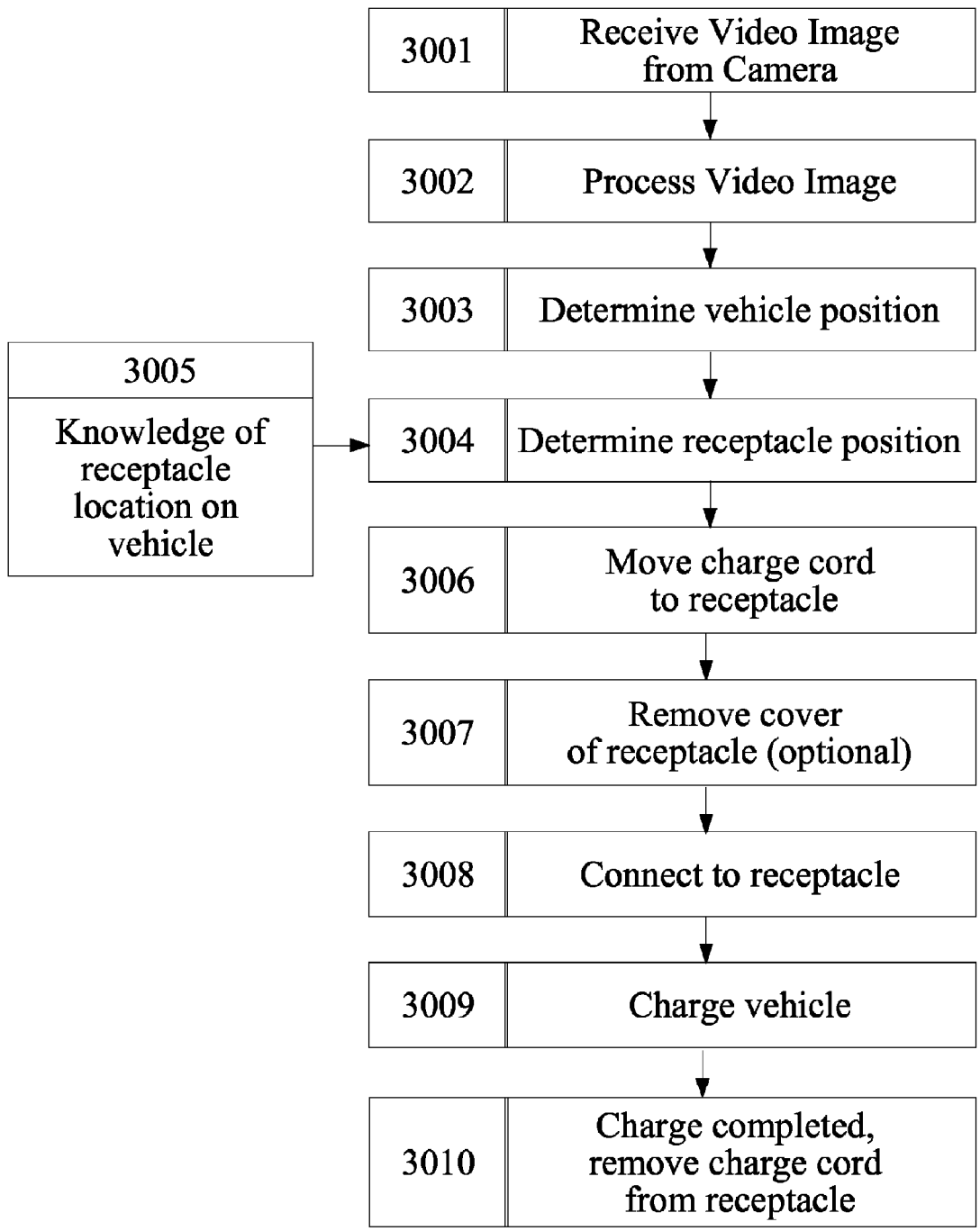
Figure 3. Automated Electric Charging Method

SYSTEM TO AUTOMATICALLY RECHARGE VEHICLES WITH BATTERIES

FIELD OF INVENTION

This invention relates to electric vehicles, plug-in hybrid electric vehicles, hybrid electric vehicles, and any other vehicles with batteries, specifically to recharge such vehicles whose battery needs to be electrically charged.

INTRODUCTION

A plug-in hybrid electric vehicle (PHEV) is an automobile which can use either electricity or gasoline. With today's high gas prices, electricity is becoming a promising alternative to power next generation automobiles. Battery electric vehicles (BEV) which use only electricity, also hold promise as a viable alternative to automobiles that just use petroleum-based fuels.

PHEV's which could have battery capacities equivalent to 10's of miles of driving are best suited for commuters who need to do short trips most of the time. An additional advantage of the PHEV is that charging can be done at home without the need of going to a gasoline station. Nonetheless, the small battery capacity of PHEV's may require recharging the batteries almost everyday. It would be convenient for an owner of a car with batteries to not have to plug in the battery each and every day that charging is required.

SUMMARY

The invention is a system and method which are defined by the claims which are hereby incorporated by reference.

DRAWINGS

FIG. 1. Vehicle Charger Embodiment 1. This is a drawing of a vehicle next to the automated charger where the camera is mounted on the base of the system.

FIG. 2. Vehicle Charger Embodiment 2. This is a drawing of a vehicle next to the automated charger where the LIDAR system is mounted on the wall.

FIG. 3. Automated Electric Charging Method. This is a flowchart of the method for automatically charging a vehicle.

DETAILED DESCRIPTION

Our invention is a system that plugs the power automatically into the vehicle with minimal intervention. The system is composed of a robotic manipulator with a camera and a processing unit. The system uses the camera and vision processing techniques to identify the vehicle's position. The robotic manipulator then directs the charging cord's plug into the charging receptacle of the vehicle. Once charging is complete, the robotic manipulator removes the plug from the vehicle and returns to a neutral position.

The invention is designed to make it easier to maintain electric vehicles, such as PHEV's and BEV's which can be charged by an external source. By having a charger that requires minimal human intervention, the user does not have to worry about the hassle of plugging and unplugging the charger everyday. The invention can be placed in a garage, at recharging stations, or, if weather-proofing is done, in an outside parking area. Additionally, our invention is not just limited to automobiles but instead should have a scope that encompasses any moving device powered by batteries, including but not limited to: golf carts, cars, trucks, motorcycles, tanks, tri-wheeled vehicles, quadrupedal vehicles, and bipedal vehicles. Vehicles which transport people and those which do not transport people also fall within the scope of this invention.

FIG. 1 shows a drawing of a typical vehicle 101 next to the automated charger. Here, the rear half of the vehicle 101 is shown. The charging receptacle 102 of the vehicle 101 connects to the plug 103 of the charger such that electrical power can be transferred from the charger to the vehicle 101. The receptacle 102 of the vehicle 101 and the plug 103 of the charger use a metal-to-metal terminal connection similar to how the plug of a refrigerator would fit into the power outlet in a home. The charging cord 106 is a conductive conduit that transfers electrical power from the base 107 of the charger to the plug 103. The means of moving said charging cord 106 in the three linear directions x,y,z is done by the robotic manipulator 104. The robotic manipulator 104 is a set of motorized linkages that can move the end-effector in any direction. The end-effector is defined as the end of a robotic manipulator 104 to which the plug 103 is attached. In this FIG. 1, the charging cord 106 is separate from the robotic manipulator 104, but other embodiments can have the charging cord 106 integrated into the robotic manipulator 104. Here, the light-sensitive device 105 is a CCD (charge-coupled device) camera which connects to the base 107. The base 107 contains the computing platform. Vision processing is defined as an algorithm that takes video image data as input and performs calculations to identify objects. Our system uses vision processing to identify the vehicle from video image data captured by the camera 105. The hardware that performs the vision processing is called the computing platform. A typical computing platform might include memory in the form of flash memory or a hard disk drive and a processing core like a CPU (central processing unit) or GPU (graphics processing unit). The base 107 also includes electronics to transfer power from the power cord 108 to the charging cord 106. Lastly, the power cord 108 is plugged into an electrical outlet in the wall.

FIG. 2 shows a drawing of another embodiment of the invention. Here, the front half of the vehicle 201 is shown. The charging receptacle 202 of the vehicle is located in the hood of the vehicle 201 near the front. The receptacle 202 and plug 203 of the charger use a system of charging based on induction where there is never a physical connection between the metal contacts of the receptacle 202 and plug 203. Once the plug 203 is inserted into the receptacle 202, complementary coils of wire are used to transfer power inductively from the plug 203 to the receptacle 202. In this embodiment, the charging cord (not visible) is integrated into the robotic manipulator 204. The light-sensitive device 205 is a LIDAR system.

LIDAR (light detection and ranging) is a method of measuring the distance of objects using light. The LIDAR system for this embodiment captures a 2-dimensional array of reflectivity and distance information from its field of view. The key difference between the video camera and a LIDAR system is that the LIDAR system generates the light source itself, whereas a camera usually relies on ambient light from the surroundings (for example sunlight). This allows the device to operate in conditions with no lighting, such as a darkened garage. Like a camera, the LIDAR system produces data that when processed can be used to help determine the position of the vehicle. Another term for LIDAR is LADAR (laser detection and ranging).

The LIDAR system 205 is mounted on the wall such that it can view the entire robotic manipulator 204 and the location of the receptacle 202. The robotic manipulator 204 attaches to the base 207 of the system. The base 207 contains the computing platform. The LIDAR system 205 communicates to the computing platform via a cord 209, though other embodiments could also use a form of wireless RF communication. Lastly, a power cord 208 from the base 207 is plugged into a power outlet on the back wall.

Additional Embodiments

As an additional embodiment, a camera is attached to the end-effector of the robotic manipulator to aid in the accurate positioning of the charging plug relative the receptacle.

As an additional embodiment, the system contains a means of detecting humans in the vicinity. Ensuring the safety of humans in the vicinity of moving robots is clearly very important. While the chance of an accident occurring is small, extra safeguards can be taken to further reduce the chance of injury. The invention is designed to be no more dangerous than any other stationary object located in a garage. With that said, it is important to mention the potential risks such a system would have. Worst-case dangers are: 1) pinching of body parts like fingers if they are placed at a joint of the robotic manipulator, 2) bruises from the manipulator bumping into an individual, 3) eye damage from a manipulator's end-effector bumping into the face of an individual. To eliminate these dangers and as an additional embodiment to the invention, the system contains a means of detecting humans in the vicinity of the charger and taking precautionary action.

Two means of detecting the presence of humans are suggested. Ultrasound sensors emit high-frequency sound waves. Motion can be detected by the reflection of these waves off objects. This technology is commonly employed in burglar systems. These sensors offer an inexpensive and simple solution to detect human motion.

Another way of detecting humans in the vicinity of the charger is to employ a light-sensitive device either in the form of a camera or a LIDAR system. In addition to detecting the relative position of the car to the charger, these or additional light-sensitive devices can be used to detect the presence of humans in the field of view. This method differs from the method employing ultra-sound sensors in that the vision processing algorithms are more intensive but have the potential to be more reliable and offer more options for precautionary action than the simpler ultra-sound sensors.

In fact, specific LIDAR systems, such as the SICK S3000 Safety Laser Scanners, are specifically designed to detect human movement for robotic systems in industrial applications.

If human movement was detected, then appropriate precautionary action can be taken. For example, if the humans were very close to the manipulator while the system was in the process of connecting the charger to the vehicle, the robotic manipulator could freeze. By not moving, the manipulator is not in danger of bumping into a human. If people were detected but they were somewhat distant from the robotic manipulator, then the charger might have enough time to disengage the plug from the receptacle and position the robotic manipulator in a safe resting position.

The system can recharge the vehicle as long as the robotic manipulator is within reach of the charging receptacle. If the driver does not park the vehicle within range of the manipulator, then the system cannot charge the car. As another embodiment of the invention, the system contains a means of helping the driver position the vehicle while parking. This can be done by using a proximity sensor to detect the distance of the car to the charger. The proximity sensor could be in the form of ultrasound, LIDAR, or a camera. As the driver approaches the charging system, the system will alert the driver when the vehicle is sufficiently close to the manipulator. Alerting the driver could be as simple as a flashing light or an audible beep. Once alerted, the driver, knowing the vehicle is in range of the charger, can stop.

Consumer vehicles come with keys to lock and unlock the vehicles. Most vehicles come with keys that have wireless remote unlocking systems which we call the remote key. The remote key uses RF to transmit information to the vehicle to unlock and lock the vehicle. As an additional embodiment of the invention, the system is equipped with a wireless remote system that can communicate with the remote key or with the vehicle itself. The method of operation would be as follows: when the user parks the car in the garage and locks the vehicle with the remote key, the charging system receives notification from the vehicle. The notification would indicate that the car is ready to be charged. The charger could then start to charge the car. Similarly, when the driver wants to use the car, he unlocks the car with the remote key. Since the vehicle is unlocked, there is a good chance the vehicle will be used. Therefore, the vehicle notifies the charger via RF communication that charging needs to be terminated and the robotic manipulator needs to disengage the plug from the vehicle.

Operation

FIG. 3 shows the flowchart of the method for automatically charging a vehicle. This embodiment of the invention starts by receiving a video image from the camera 3001. The image is processed using vision processing techniques 3002 to determine the position of the vehicle 3003.

Once the location of the vehicle is determined, the position of the charging receptacle on the vehicle needs to be determined 3004. There are a few methods the system can employ to identify the location of the charging receptacle 3005. The methods are bulleted below:

- In the process of determining the vehicle position, the system determines the make and model of the vehicle. Typically, this can be done by using vision processing to identify certain vehicle characteristics. If such characteristics are unique to the make and model of a vehicle, then the model of the vehicle can be identified. Consequently, a database containing the position of the charging receptacle for any vehicles' make and model can be accessed to determine the receptacle location of the vehicle in question.
- Alternatively, vision processing can be used to search for the charging receptacle itself. If the visual characteristics of the receptacle make it so that it can be easily identified visually, then such an algorithm can be used to identify the location of the charging receptacle relative to the vehicle, all by itself, without the need of a database of receptacle locations for all makes and models.
- A third means of locating the receptacle lends itself particularly well to a home charging device. Since at home the same vehicle will normally be parked in the same location, the system needs to identify the location of the receptacle relative to the vehicle only once. This could be done by having the user identify the make and model of the car, himself, through a user interface. Again by accessing a database of all makes and models, the location of the receptacle can be determined.
- Finally, the automated charging system could employ some sort of learning behavior. The system could use the camera(s) to watch the driver insert the charging plug manually, and from such actions and by using vision processing, the system, itself, could try to decipher where the charging receptacle is located. This could be termed visual training where the charging system learns where the charging receptacle is located by actively watching the plug being inserted into the vehicle.

Once the receptacle position is known, then the system can proceed to move the plug of the charging cord towards the receptacle 3006. The system plans out the motion of the robotic manipulator using path planning algorithms and kinematic models of the system. Additionally, the torque of the linkages can be monitored for diagnostic purposes. If out-of-the-ordinary behavior occurs (for example, excessive torques or forces, motion that does not correlate with the expected response, objects obstructing the vision), then the system can take precautionary actions.

Once the plug of the charging cord reaches the receptacle, depending on the vehicle, it might be necessary to remove a cap or cover to expose the receptacle 3007. The end-effector of the robotic manipulator can have a specialized hook or gripper system, specifically designed to remove the cap. The vision system provides feedback to precisely control the motion of the grippers, directing them through the proper motions to open the cap.

Once the receptacle cap is removed, the manipulator engages the plug into the receptacle 3008. A proper connection is confirmed by the electronics of the system. The plug may contain additional electrical contacts to verify the integrity of the connection. Alternatively, inductively coupled plug/receptacle pairs can measure the electrical response of an applied signal to verify the connection integrity.

Once the connection is verified, the vehicle's batteries are charged 3009. Whether the charging time lasts a few hours or a few minutes, the system stays connected until the batteries are fully charged or until an external event necessitates the premature removal of the plug.

Once charging is completed, the robotic manipulator disconnects the plug from the receptacle, closes the receptacle cap, and moves to a resting position 3010. The system maintains a resting position until at a later time, it recognizes that a vehicle needs to be charged.

CONCLUSION

While my above figures and descriptions contain many specificities, these should not be construed as limitations on the scope of the invention, but rather as an exemplification of some preferred embodiments thereof. Accordingly, the scope of the invention should be determined not by the embodiments illustrated, but by the appended claims and their legal equivalents.

We claim:

1. A system to automatically charge batteries in a vehicle, the system comprising:
    a light-sensitive device which outputs a 2-dimensional array of pixel information;
    a computing platform;
    a means for moving a charging cord of a charger in the three linear directions x, y, z relative to the vehicle;
    a means for determining the relative position of the vehicle relative to said system using the light-sensitive device and operating said means for moving said charger to bring said charging cord into the correct position to convey power to the vehicle;
    a means for detecting if people are located within the vicinity of the charger; and
    a means for defining precautionary actions the charger can take if humans are detected in the vicinity.

2. The system of claim 1, wherein the system is further comprised of a plug/receptacle pair where the plug of said system engages the receptacle of said vehicle such that electrical power can be transferred from the system to the vehicle.

3. The system of claim 1, wherein the means of detecting people within the vicinity is done with a device that uses ultrasound.

4. The system of claim 1, wherein the means of detecting people within the vicinity is done with said light-sensitive device.

5. The system of claim 1, wherein the means of detecting people within the vicinity is done with a 1-dimensional or 2-dimensional LIDAR (light detection and ranging).

6. The system of claim 1, wherein said light-sensitive device is a video camera device.

7. The system of claim 1, wherein said light-sensitive device is a LIDAR system.

8. The system of claim 1, wherein the system is further comprised of a means to notify the driver when to stop the vehicle while the driver is parking the vehicle near to said system.

9. The system of claim 1, wherein said means of moving the charging cord of the charger is a robotic manipulator.

10. The system of claim 9, wherein the said charging cord is integrated into said robotic manipulator.

11. The system of claim 1, wherein the system is further comprised of an RF receiver which allows communication with the vehicle or a remote key whereby the charger can be notified by either the vehicle or the remote key that the vehicle is ready to be charged.

12. The system of claim 2, wherein the system is further comprised of a cap that covers said receptacle which must be removed or opened before charging can be performed.

13. The system of claim 2, wherein electrical power is transferred by physically contacting low resistance materials of the charging receptacle of the vehicle and the plug of the system providing for current flow between the two units.

14. The system of claim 2, wherein electrical power is transferred inductively without metal contacts between the charging receptacle of the vehicle and the plug of the system.

15. A method for an automated electric vehicle recharging system, the method comprising:
    receiving a video image data from a light-sensitive device which outputs a 2-dimensional array of pixel information;
    processing said video image data from the light-sensitive device using a computing platform in order to determine the relative position of the vehicle relative to said system;
    identifying the location of a charging receptacle of the vehicle;
    automatically moving a charging cord of a charger to said receptacle in the three linear directions x, y, z relative to the vehicle;
    charging the vehicle once said charging cord is connected to said receptacle;
    detecting if people are located within the vicinity of the charger; and
    defining precautionary actions the charger can take if humans are detected in the vicinity.

16. The method of claim 15, where the method of identifying the location of the recharging receptacle is done by using a vision based-algorithm to recognize the charging receptacle on the vehicle.

17. The method of claim 15, wherein, the means of receiving image data is a camera.

18. The method of claim 15, wherein, the means of receiving image data is a LIDAR system.

19. The method of claim 18, wherein the method further comprises:
 using reflectance and distance information from said LIDAR to help determine the location of the vehicle;
 identifying the location of the charging receptacle;
 and moving a charging cord to said receptacle.

20. The method of claim 15, where the method of identifying the location of the recharging receptacle is done by having a-priori knowledge of the location of the recharging receptacle for a particular vehicle make and model.

* * * * *